US006221948B1

(12) United States Patent
Yamaguchi et al.

(10) Patent No.: US 6,221,948 B1
(45) Date of Patent: Apr. 24, 2001

(54) CARBON FLUORIDE COMPOSITION, PAINT, IMAGE FORMING MATERIAL, COMPLEX MATERIAL AND METHOD OF MANUFACTURING THE SAME COMPLEX MATERIAL

(75) Inventors: Fumihiko Yamaguchi; Tomohiro Isogai; Tomohiro Hosomi; Shigeru Maruyama, all of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/194,753

(22) PCT Filed: Apr. 30, 1997

(86) PCT No.: PCT/JP97/01510

§ 371 Date: Dec. 3, 1998

§ 102(e) Date: Dec. 3, 1998

(87) PCT Pub. No.: WO97/46612

PCT Pub. Date: Dec. 11, 1997

(30) Foreign Application Priority Data

Jun. 5, 1996 (JP) .................................................. 8-142961

(51) Int. Cl.$^7$ ........................... G03G 15/04; C08K 3/16; C08L 27/12

(52) U.S. Cl. ............................ 524/424; 524/544; 430/66

(58) Field of Search .................................... 524/424, 502, 524/511, 544; 430/66

(56) References Cited

U.S. PATENT DOCUMENTS 5,587,110 * 12/1996 Yamana et al. ...................... 252/502
5,712,062 * 1/1998 Yamana et al. ...................... 252/502

FOREIGN PATENT DOCUMENTS 6-256008 9/1994 (JP) .............................. C01B/31/00
7-149448 6/1995 (JP) ................................ B65H/5/06
8-15960 1/1996 (JP) .............................. G03G/15/02

OTHER PUBLICATIONS

International Preliminary Examination Report for PCT/JP97/01510.

* cited by examiner

*Primary Examiner*—Peter A. Szekely
(74) *Attorney, Agent, or Firm*—Sughrue, Mion, Zinn, Macpeak & Seas, PLLC

(57) ABSTRACT

An image forming member for electrophotographic copying machines, facsimile machines and printers which has semi-conductivity, non-tackifying property and high dielectric property and therefore has high charging and image-transferring efficiency, is excellent in feeding property and separability of papers, is free from paper jamming and can give an excellent image stably; a paint used for the member; a carbon fluoride composition used for the paint; a composite material of fine particles of carbon fluoride; and a process for preparing the composite material are provided. The carbon fluoride composition comprises carbon fluorides and at least one selected from the group consisting of resins and rubbers and has semi-conductivity, non-tackifying property and a specific dielectric constant of not less than 10 at 25° C. at 1 kHz.

8 Claims, 2 Drawing Sheets

CARBON FLUORIDE COMPOSITION, PAINT, IMAGE FORMING MATERIAL, COMPLEX MATERIAL AND METHOD OF MANUFACTURING THE SAME COMPLEX MATERIAL

TECHNICAL FIELD

The present invention relates to a carbon fluoride composition, a paint containing the composition and an image forming member provided with a surface layer obtained by applying the paint. Also the present invention relates to a composite material comprising fine particles of carbon fluoride and a process for preparing the composite material.

BACKGROUND ART

A fluorine-containing resin and a fluorine-containing rubber have excellent properties such as heat resistance, oil resistance, solvent resistance, chemical resistance and the like as compared with resins and rubbers for general uses, and are used widely as industrial materials in the field where these properties are required. While making the best use of these excellent properties, further three properties such as semiconductivity, non-tackifying property and high dielectric property are demanded depending on applications.

For example, in the fields of image forming members for electrophotographic copying machines, facsimile machines and printers, a material having well balanced properties such as semi-conductivity, non-tackifying property and high dielectric property is required for charging members, transferring members and feeding members.

Namely a high dielectric property is required in order to conduct charging and image-transferring efficiently and feed papers securely. Also it is required that the material is semi-conductive in order to remove an induced charge immediately and prevent disturbance of an image due to occurrence of discharging at peeling off. Further in order to prevent contamination of each of the above-mentioned members by a toner and paper dust, it is required not to lower the excellent non-tackifying property which the fluorine-containing resin and fluorine-containing rubber possess inherently. Thus the above-mentioned members satisfying all these three properties are demanded.

For example, JP-A-7-295391 discloses an image-transferring belt of a three-layer structure comprising an inner layer of a medium-resistant rubber material, a dielectric layer as an intermediate layer and an electrically resistive layer as a surface layer containing dispersed carbon particles in order to provide an image-transferring belt which assures good feeding property and separability of papers and can give a good image stably. Also in case of a full-color copying machine and the like, it is necessary to transfer a toner image formed on a surface of an electrophotographic sensitive member onto an image-transferring material by multi-color transfer of 3 or 4 colors, and therefore a step-up for changing transfer conditions is carried out with increase in a number of feedings and thus higher voltages are applied in order. Therefore the image-transferring member having a large dielectric constant is desirable from the point that a large amount of electric charges can be maintained at low voltage. JP-A-7-281535 discloses a dielectric carrier article for image-transferring material which is obtained from a composition comprising a vinylidene fluoride resin and a methyl methacrylate resin in order to provide a dielectric article which assures a small change of a volumetric resistivity against change in humidity and temperature and has a high dielectric constant. Also JP-A-7-110582 discloses an electrostatically adsorbable and removable sheet which is used as an electrophotographic transfer sheet, paper adsorbing sheet of printers and the like and comprises a non-stretched thin dielectric article obtained by melt-extruding a vinylidene fluoride resin and barium titanate powder in order to improve electrostatically adsorbing and removing characteristics and a tearing strength.

However there is a problem that any of the members described in those patent publications cannot satisfy the above-mentioned three properties.

Further JP-A-7-149448 discloses an electrically conductive and non-tackifying roller in which an electrically resistive layer comprising a composition containing carbon fluoride particles with a molar ratio F/C of fluorine atom to carbon atom of more than 0.5 and less than 1.0 is provided on an electrically conductive supporting body. Though proper electric conductivity and non-tackifying property are obtained, it is desired to further improve a dielectric property. Also according to the process described in that publication, carbon fluoride particles which are fluorinated only in their surface region or up to the inside thereof uniformly and thus have a medium degree of fluorination can be obtained. There is a problem, however, that even by controlling reaction conditions by any means, it is difficult to stably obtain a mixture of highly fluorinated carbon fluoride particles and slightly fluorinated carbon fluoride particles.

Also in order to impart the above-mentioned semiconductivity to a resin composition and rubber composition, an agent for imparting electric conductivity, for example, carbon black, carbon fiber, metal powder, ionic surfactant or the like has been used. In order to impart the above-mentioned non-tackifying property, an agent for imparting non-tackifying property, for example, a fluorine-containing oil, a fluorine-containing resin such as tetrafluoroethylene-hexafluoropropylene copolymer, silicone oil or the like has been used. Further in order to impart the above-mentioned high dielectric property, an agent for imparting a dielectric property, for example, lead zirconate titanate lanthanate, lead zirconate titanate, barium titanate or the like has been used.

However in case where the three properties are needed at the same time, there are problems that not only a satisfactory performance cannot be obtained only by simply mixing the above-mentioned three agents but also since the above-mentioned agent for imparting conductivity and agent for imparting high dielectric property are substances having a high surface energy, even if the agent for imparting non-tackifying property is used, lowering of the non-tackifying property cannot be avoided and even if a fluorine-containing resin and fluorine-containing rubber are used as the above-mentioned resin and rubber, only a composition having non-tackifying property lower than inherent non-tackifying property of the resin and rubber can be obtained.

An object of the present invention is to provide an image forming member for electrophotographic copying machines, facsimile machines and printers. Because the member has semi-conductivity, non-tackifying property and high dielectric property, the member has a high charging efficiency and image-transferring efficiency, is excellent in feeding property and separability of papers, is free from jamming of papers and can give a good image stably. The other objects are to provide a paint used for the member; a carbon fluoride composition used for the paint; a composite material comprising fine particles of carbon fluoride; and a process for preparing the composite material.

DISCLOSURE OF THE INVENTION

The present invention relates to the carbon fluoride composition comprising carbon fluoride particles and at least one selected from the group consisting of resins and rubbers, said composition possesses semi-conductivity and non-tackifying property and has a specific dielectric constant of not less than 10 at 25° C. at 1 kHz.

Further the present invention relates to the paint comprising the above-mentioned carbon fluoride composition and a liquid carrier.

Further the present invention relates to the image forming member for electrophotographic copying machines facsimile machines and printers which comprises the electrically conductive supporting body having a surface layer formed by applying the paint.

Further the present invention relates to the composite material comprising fine particles of carbon fluoride, in which the composite material is covered with completely fluorinated carbon fluoride fine particles having a F/C of not less than 1 and the inside of the composite material comprises a carbon fluoride fine particle or particles having a F/C of not more than 0.1.

Further in the present invention, it is preferable that in preparing the composite material, the completely fluorinated carbon fluoride fine particles having a F/C of not less than 1 are mixed simply with the carbon fluoride fine particles having a F/C of not more than 0.1.

Further in the present invention, it is preferable that in preparing the composite material, the completely fluorinated carbon fluoride fine particles having a F/C of not less than 1 are mixed with the carbon fluoride fine particles having a F/C of not more than 0.1, in water, in organic solvent, in rubber or in molten resin.

Further the present invention relates to the composite material comprising fine particles of carbon fluoride in which the composite material is covered with completely fluorinated carbon fluoride fine particles having a F/C of not less than 1 and the inside of the composite material comprises an electrically conductive fine particle or particles having a particle size of at least 5 times the particle size of the completely fluorinated carbon fluoride fine particles.

Further in the present invention, it is preferable that in preparing the composite material, the completely fluorinated carbon fluoride fine particles having a F/C of not less than 1 are simply mixed with the electrically conductive fine particles having a particle size of at least 5 times the particle size of the completely fluorinated carbon fluoride fine particles.

Further in the present invention, it is preferable that in preparing the composite material, the completely fluorinated carbon fluoride fine particles having a F/C of not less than 1 are mixed with the electrically conductive fine particles having a particle size of at least 5 times the particle size of the completely fluorinated carbon fluoride fine particles, in water, in organic solvent, in rubber or in molten resin.

BEST MODE FOR CARRYING OUT THE INVENTION

Figure 1:
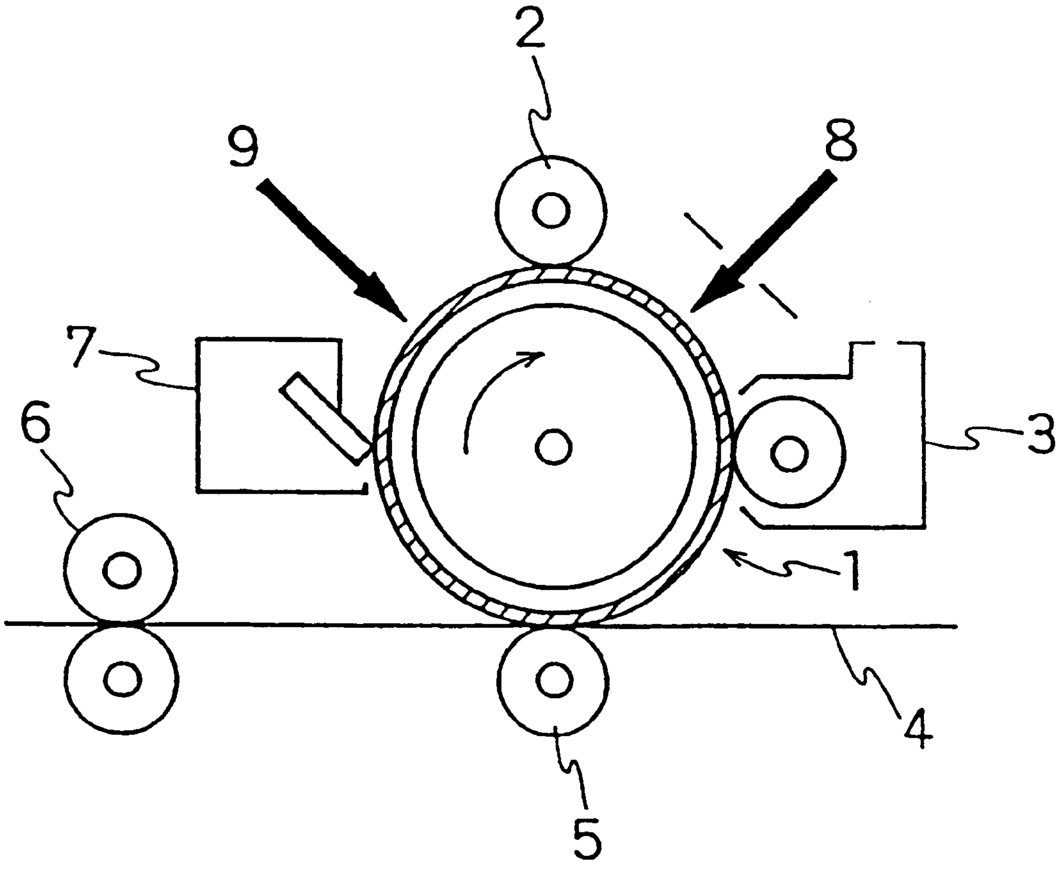
FIG. 1 is an illustrative view of an electrophotographic copying machine in which the semi-conductive roller of the present invention is used as a charging roller.

A major feature of the carbon fluoride composition of the present invention is the use of a mixture of two kinds of carbon fluoride particles, namely the completely fluorinated carbon fluoride particles and the slightly fluorinated carbon fluoride particles having a molar ratio of fluorine atom to carbon atom (hereinafter referred to as "F/C") of less than 0.1. Thereby the image forming member for electrophotographic copying machines, facsimile machines and printers which has a surface layer obtained by applying the paint containing the above-mentioned composition (hereinafter referred to as "image forming member" or "member") is excellent in semi-conductivity, non-tackifying property and particularly high dielectric property.

The above-mentioned high dielectric property means that a specific dielectric constant is not less than 10 at 25° C. at 1 kHz, and is preferably from 10 to 10000, more preferably from 20 to 2000 though it varies depending on application, coating thickness and electric resistance. When the specific dielectric constant is less than 10, in case where the composition is used for the member, for example, a charging member or image-transferring member, a charging efficiency and image-transferring efficiency are lowered, a vivid image is difficult to obtain and a power source of higher voltage is necessary. Particularly in case of full-color machines, in order to conduct multicolor transferring efficiently, higher specific dielectric constant is required. Also in feeding papers, a higher dielectric constant is required to efficiently conduct electrostatic adsorption and removal. When the specific dielectric constant is less than 10, a paper is not adsorbed securely, which results in jamming of the paper. The upper limit of the specific dielectric constant is set to the value as mentioned above since an electrostatic capacity becomes higher than required and a time constant becomes too large, and thus an electric current necessary for charging and charge-removal becomes too large and a charging and charge-removal time becomes too long.

The semi-conductivity means a proper electric conductivity in which in the above-mentioned member, charging and removing electric charge can be conducted efficiently. The semi-conductivity varies depending on application, coating thickness and dielectric constant in view of the time constant, and a resistance can be set optionally within the range of from $10^4$ to $10^{12}$ Ωcm. Further a difference in electric resistance between any points on surface of the member is within one order, preferably within a half order.

The non-tackifying property means that the above-mentioned members are difficult to be contaminated with, for example, residual toners, paper dusts and the like, have non-tackiness to the extent of hardly accumulating the contaminant, and can be easily cleaned by usual cleaning apparatuses. The non-tackifying property is a property which does not cause obstruction against charging and image-transferring functions. Though the non-tackifying property depends on the surface condition, at least one factor to be non-tackiness is an angle of contact to water which is not less than 90 degrees, more preferably not less than 100 degrees.

In order to prevent such contaminations, various cleaning mechanisms are usually provided. Use of the agents for imparting electric conductivity and high dielectric property leads to remarkable lowering of non-tackifying property and thereby increases importance of the cleaning mechanism, which results in obstructing downsizing of a printing apparatus and further shortens lives of the above-mentioned members.

Then explained below are carbon fluoride particles which can be used to obtain the well-balanced three properties mentioned above.

The carbon fluoride particles according to the present invention comprise poly(carbon monofluoride) as a main component, and preferable is one obtained by fluorinating a carbon material having an average particle size of not more than 1 μm, preferably not more than 0.1 μm with a fluorine gas. In the carbon fluoride particles to be obtained from carbon materials having an average particle size exceeding 1 μm, for example, petroleum cokes, graphite powder, carbon fiber and the like, its amount has to be increased to impart semi-conductivity and non-tackifying property to a resin or a rubber, and there is a tendency that there occur disadvantages such as increased surface roughness, deterioration of mechanical strength, uneven resistivity, and the like of the obtained composition.

The carbon material suitable for the carbon fluoride particles is a carbon black having the above-mentioned average particle size. As the carbon black, there are used ones commercially available, for example, furnace black for rubbers (for example, Asahi #55 and the like made by Asahi Carbon Kabushiki Kaisha), channel black for color (for example, Leben 7000 made by Columbia Carbon Co., Ltd.), thermal black (Sevacarbo MT-C1 made by Columbia Carbon Co., Ltd.) and the like.

Among the carbon blacks, ones particularly generally called an electrically conductive carbon black are preferable. The electrically conductive carbon black is defined by using such factors that an average particle size is small (average particle size not more than 0.1 μm), a surface area is large ($N_2$ surface area not less than 50 $m^2/g$), a structure is progressed (oil absorption amount not less than 100 cc/g), impurities content is small (ash content less than 0.1%) and forming into graphite is advanced. Because the electrically conductive carbon black can impart electric conductivity to materials in a relatively small mixing amount, it is used widely. Example thereof are ones commercially available, for instance, Ketjen Black EC and Ketjen Black EC-600JD (available from Ketjen Black International Kabushiki Kaihsa), Black Purles 2000, Black Purles 3700 and Vulcan XC-72 (available from Cablack Kabushiki Kaisha), Denka Black, HS100 (available from Denki Kagaku Kogyo Kabushiki Kaisha), Conductex 950 (available from Columbia Carbon Co., Ltd.), #3030B (available from Mitsubishi Chemical Co., Ltd.) and the like.

In order to obtain the mixture of two kinds of carbon fluoride particles which can be used in the present invention, for example, there are (1) a method of obtaining by one reaction operation, (2) a method of obtaining by preparing two kinds of carbon fluoride particles in separate reaction operations and then mixing them, and (3) a method of obtaining by separating the mixture prepared in above (1) into two kinds of carbon fluoride particles and then re-mixing them. From the viewpoints of easy control of the reaction and easy operation, the method (2) is preferred.

In the above methods of (1) to (3), the fluorination is carried out by a method of contacting fluorine gas to a carbon material, for example, a carbon black at a reaction temperature ranging from 200° to 600° C., preferably from 300° to 500° C. When the reaction temperature is lower than 200° C., there occur problems that the fluorination reaction goes slowly, that a carbon fluoride having a covalent C—F bond is difficult to obtain, that the fluorination degree is difficult to increase since a fluorine-graphite interrelation compound having an ionic or semi-ionic C—F bond is produced, that thermal stability is not sufficient and that inherent non-tackifying property and lubricity of the carbon fluoride are not exhibited. On the contrary, when the reaction temperature is higher than 600° C., thermal decomposition reaction is easy to occur, a production of a gaseous fluorocarbon compound occurs preferentially, and thus control of the reaction becomes difficult and a yield of the obtained carbon fluoride particles lowers. Also there are some cases where sudden and sharp thermal cracking reaction occurs resulting in an explosion. Therefore it is necessary to pay attention to it.

The method (2) is carried out in such a manner that in the method (1), for example, at first the completely fluorinated carbon fluoride particles are prepared by using sufficient amount of fluorine gas and a sufficient reaction time, and separately the slightly fluorinated carbon fluoride particles are prepared by using a decreased amount of fluorine gas or a shortened reaction time, and then the slightly fluorinated carbon fluoride particles may be mixed with the completely fluorinated carbon fluoride particles.

The method (3) is carried out in the manner mentioned below. In the method (1), for example, carbon fluoride particles fluorinated to a certain extent are prepared by controlling the reaction conditions. At that time, the completely fluorinated carbon fluoride particles can be obtained by scooping up with a spoon a reaction product tinged with white and existing in the upper part of a reaction vessel. Also slightly fluorinated carbon fluoride particles can be obtained from the lower part in the reaction vessel. Each of carbon fluoride particles can also be obtained by dispersing the whole amount of the reaction product in a proper solvent and then centrifuging by using a difference in a specific weight. The two kinds of carbon fluoride particles obtained in such a manner may be mixed with each other.

In any of the methods (1) to (3), the fluorine gas used for the reaction may be diluted with an inert gas such as nitrogen, argon, helium, carbon tetrafluoride or the like or may contain a hydrogen fluoride. The reaction can be conducted at normal pressure, and even under reduced pressure or under pressure, there is no problem with the reaction.

In the above methods, the reaction time, fluorine gas flow and the like may be optionally adjusted depending on the reactivity of a starting material, i.e. carbon material with fluorine and a desired F/C (calculated by using fluorine content mentioned hereinafter). The preferred reaction vessel is of box type made of nickel or monel alloy in which a carbon powder layer is allowed to stand and a fluorine gas diluted properly is passed on the upper part of the powder layer. Also a fluidized bed type and vibrating type in which the powder layer is moved can be used.

The completely fluorinated carbon fluoride particles obtained by such methods do not increase its weight after completely fluorinated, has the F/C of not less than 1.0 and is tinged with white.

The slightly fluorinated carbon fluoride particles have the F/C of not more than 0.1 and is tinged with black. Since a rising of temperature occurs due to a reaction heat depending on the reaction conditions, there is a case where a part of the produced slightly fluorinated carbon fluoride particles contain a highly fluorinated part, and such a part can be removed by scooping, for example, with a spoon.

In the mixture of the two kinds of carbon fluoride particles, a weight ratio of the completely fluorinated carbon fluoride particles to the slightly fluorinated carbon fluoride particles is from 1/99 to 99/1, preferably from 10/90 to 99/1.

Since the slightly fluorinated carbon fluoride particles are fluorinated very slightly, an interaction among particles thereof is weakened as compared with the starting material, i.e. carbon black and even the slightly fluorinated carbon fluoride alone has good dispersibility and improved properties in viscosity increasing and surface finishing of a paint. Thus these properties are the essential properties to distinguish the slightly fluorinated carbon fluoride from a carbon black.

By mixing the completely fluorinated carbon fluoride particles with the slightly fluorinated carbon fluoride particles, high dielectric constant, semi-conductivity and non-tackifying property which cannot be obtained from the individual carbon fluoride particles are exhibited. This is assumed to be that the mixture functions as a certain kind of composite material comprising the fine particles. In this specification, an average degree of fluorination of this whole mixture is shown as a degree of fluorination of the carbon fluoride.

Also in the present invention, a fluorine content of carbon fluoride particles is measured in the following manner. Carbon fluoride particles are wrapped together with a combustion improver $Na_2O_2$ and polyethylene film and burned in a flask filled with oxygen. An amount of the produced hydrogen fluoride is measured with a fluoride ion meter (Ion Analyzer 901 of Orion Corp.) through usual method. A fluorine content is calculated from the obtained amount. Then the F/C is calculated based on the obtained fluorine content.

As the resin or rubber used in the present invention, there are thermoplastic resins, thermosetting resins or rubbers.

The thermoplastic resins can be used advantageously as the materials being high in processability since they can be plastically deformable by heating after once formed into a molded article. For example, there is a fluorine-containing resin, polyamide, polyamideimide, polyacetal or the like. Among them, the fluorine-containing resin is preferable from the points that it is excellent in heat resistance, chemical stability and non-tackifying property and there is no change in these properties with the lapse of time.

Examples of the fluorine-containing resins are polytetrafluoroethylene; copolymers of tetrafluoroetylene with at least one of other copolymerizable ethylenically unsaturated monomer (for example, olefins such as ethylene and propylene, halogenated olefins such as hexafluoropropylene, vinylidene fluoride, chlorotrifluoroethylene and vinyl fluoride, and perfluoroalkyl vinyl ethers); polychlorotrifluoroethylene; polyvinylidene flouride; and the like. Particularly preferable flourine-containing resins are polytetrafluoroethylene, copolymers of tetrafluoroethylene with at least one of hexafluoropropylene, perfluoro(methyl vinyl ether), perfluoro(ethyl vinyl ether) and perfluoro (propyl vinyl ether) (containing generally in an amount of not more than 40% by mole with respect to tetrafluoroethylene), and the like. When the fluorine-containing resin is used, there is exhibited an effect such that a composition having an excellent heat resistance, non-tackifying property, water- and oil-repelling property, lubricity and chemical resistance as compared with resins for general uses can be obtained.

As the polyamides, there can be used various materials commercially available as nylon resins. For example, there are 6 nylon, 66 nylon, 610 nylon, 612 nylon, 11 nylon, 12 nylon, 46 nylon and the like. Also aramide wherein an aromatic component is introduced in a main chain, is encompassed therein. As the aramide, there are poly(paraphenylene terephthalamide) and the like. These, though relatively inexpensive, exhibit effects such as an excellent heat resistance, high mechanical strength and excellent lubricity.

As the polyamideimide, there is, for example, Toron (available from Mitsubishi Kagaku Kabushiki Kaisha) obtained by the reaction of trimellitic anhydride and aromatic diamine, and the like, which exhibits effects such as a very high mechanical strength and heat resistance.

When the thermosetting resins are used, since they have a three-dimensional structure after being cured, they can allow properties such as heat resistance, weatherability and chemical resistance and can be used advantageously mainly as the paint composition. For example, there are silicone resins, phenol resins and the like.

As the silicone resins, there can be, for example, polymers generally called the silicone resins having a three-dimensional network structure and being obtained by hydrolyzing organosiloxane. As the commercially available ones, there are, for example, SR 2400 (available from Toray Dow Corning Silicone Kabushiki Kaisha) and the like. Also there are ones being copolymerized with another organic resin generally called the silicone modified resin. There are silicone alkyd resin, silicone polyester resin, silicone epoxy resin and the like, depending on the kinds of organic resins to be copolymerized. As the commercially available resins, there are, for example, SR2100, SR2108, SR2115 (all available from Toray Dow Corning Silicone Kabushiki Kaisha) and the like which exhibit effect that low temperature curing is possible at relatively low cost.

When the rubbers are used, because of elasticity of them, the composition can be endowed with property to be deformed by a small stress and restored to the original state, and can be used advantageously as the materials for sealants, adhesives and rollers. Examples of the rubbers are ones for general uses, such as a silicone rubber or a fluorine-containing rubber, a styrene-butadiene rubber, a polyurethane rubber, a nitrile rubber, a chloroprene rubber, EPDM or the like. Among them, the fluorine-containing rubber is preferable from the points that it is excellent in heat resistance, chemical stability and non-tackifying property and there is no change in these properties with the lapse of time.

As the silicone rubbers, there are various materials commercially available for sealants, coatings, formation of die and the like.

The silicone rubbers are generally classified into various grades, depending on their states and curing mechanisms, and are roughly classified into Mirable type silicone rubber and liquid form silicone rubber. The Mirable type silicone rubber is of a type heat-curing by adding a vulcanizing agent during the use, and is molded and processed in the same manner as in general organic rubbers. The Mirable type silicone rubbers are used as materials for key pats of desk-top calculators and the like and also rollers for an electrophotographic copying machine. The liquid form silicone rubbers are in the form of a liquid having low density and requires no specific curing device. They are cured and formed into rubbers at room temperature or by heating, and are featured by excellent workability. There are two types of liquid form silicone rubbers, one component type and two component type, and as the curing types, they are classified into a condensation type and an addition type. The liquid form silicone rubbers are widely used as adhesives, sealants, coatings, potting agents and the like.

Both the Mirable type and liquid form silicone rubbers exhibit effects such as excellent electrical property as well as excellent heat resistance and cold resistance, good compression restoration property, chemical resistance, oil resistance and weatherability in a wide temperature range.

The fluorine-containing rubber is a highly fluorinated elastic copolymer, and particularly preferable fluorine-containing rubbers are elastic copolymers of generally 40 to 85% by mole of vinylidene fluoride with at least one of other copolymerizable fluorine-containing ethylenically unsaturated monomers. The fluorine-containing rubber which contains iodide in the polymer chain also is, for instance, a fluorine-containing rubber which mainly comprises an elastic copolymer of the same % by mole as mentioned above of vinylidene fluoride with at least one of other copolymerizable fluorine-containing ethylenically unsaturated monomers, said copolymer being containing 0.001 to 10% by weight, preferably 0.01 to 5% by weight of iodide at its polymer end (JP-A-52-40543). Typical examples of the other ethylenically unsaturated monomers which are copolymerized with vinylidene fluoride to provide the elastic copolymers are hexafluoropropylene, pentafluoropropylene, trifluoroethylene, trifluorochloroethylene, tetrafluoroethylene, vinyl fluoride, perfluoro(methyl vinyl ether), perfluoro(ethyl vinyl ether), perfluoro(propyl vinyl ether), and the like. Particularly preferable fluorine-containing rubbers are vinylidene fluoride/hexafluoropropylene elastic copolymer and vinylidene fluoride/tetrafluoroetylene/hexafluoropropylene elastic copolymer. The use of the fluorine-containing rubbers gives effects such as excellent heat resistance and chemical resistance.

When the above-mentioned rubbers for general purposes are used, heat resistance, chemical resistance and the like are poor as compared with the fluorine-containing rubbers, but a flexibility is easy to obtain and cost is low.

In the present invention, by combination use of the fluorine-containing resin and fluorine-containing rubber, effects of giving proper flexibility and excellent non-tackifying property are exhibited.

In the present invention, the mixing ratio of the mixture of the above-mentioned two kinds of carbon fluoride particles and a resin and/or rubber is 1/99 to 90/10 (weight ratio, hereinafter the same), preferably 5/95 to 50/50, particularly preferably 10/90 to 30/70. If the mixing amount of the carbon fluoride particles becomes small, sufficient effect of adding the carbon fluoride particles is not obtained, and if it becomes too much, mechanical strength such as tensile strength tends to lower.

Additives to be usually used may be added to the carbon fluoride composition of the present invention if necessary. As such additives, there are, for example, a vulcanizing agent, vulcanization accelerator, vulcanizing auxiliary, inorganic filler, releasing agent and the like. The mixing amount of the additives is not more than 20 parts by weight, preferably not more than 15 parts by weight based on 100 parts by weight of the resin and/or rubber. Also in order to enhance abrasion resistance, low molecular weight polytetrafluoroethylene can be added in an amount up to 20 parts by weight.

The carbon fluoride composition of the present invention is mixed and prepared by the usual method such as the following method.

(1) In case where a resin is used,

A resin, a mixture of two kinds of carbon fluoride particles and, if necessary, various additives are mixed in a mixer such as a V type blender, tumbler and Henshel mixer and further mixed in a melt kneader such as a double screw extruder to give the carbon fluoride composition.

(2) In case where a rubber is used

A mixture of two kinds of carbon fluoride particles and, if necessary, various additives are added to a rubber for vulcanization in the form of a solid, and mixed by the use of, for example, a banbury mixer or a rubber roll to form into the homogeneous carbon fluoride composition. Also as another mixing method of these additives, there is a method to pre-mix them with the rubber by a usual open roll and kneader and then mix with other components.

The carbon fluoride composition of the present invention can be used for paints. Further the paint can be used particularly suitably for an electrically resistive layer of a semi-conductive roller of electrophotographic copying machines.

Also in case where fluorine-containing rubbers are used as the rubber, a semi-conductive, non-tackifying and highly dielectric carbon fluoride composition can be provided. The best mode in this case is explained below.

The mixture of two kinds of carbon fluoride particles is mixed homogeneously with a fluorine-containing rubber composition for the vulcanization by usual mixing method of a fluorine-containing rubber composition for the vulcanization, for example, with a banbury mixer, rubber roll or the like. Also as another mixing method of these additives, there is a method to pre-mix them with the fluorine-containing rubber by a usual open roll and kneader and then mix with other components.

The thus homogeneously mixed carbon fluoride composition containing a fluorine-containing rubber also can be used as a composition in the form of a liquid being dispersed or dissolved properly in water or organic solvent.

This liquid composition can be used for the purpose of the present invention, being impregnated or coated onto paper, fiber cloth, film, sheet, plate, tube, pipe, container and other molded articles (Materials of them to be used are synthetic resin, rubber (including a fluorine-containing rubber), metal, ceramic and the like) to be vulcanized and deposited.

As the organic solvents, there can be used methyl ethyl ketone, acetone, cyclohexanone, amyl acetate, dioxane, tetrahydrofuran alone or in combination of not less than two kinds thereof.

As mentioned above, the carbon fluoride composition of the present invention which is obtained by using a fluorine-containing rubber can be vulcanized under usual conditions in accordance with the known method for vulcanizing a fluorine-containing rubber, and the intended vulcanized rubber having semi-conductivity, non-tackifying property and high dielectric property is obtained without impairing various properties inherent to rubbers.

Also in the carbon fluoride composition of the present invention, it is preferable that a difference in a volumetric resistance between any points on surface of the member is within one order in the range of $10^4$ to $10^{12}$ Ωcm. If the volumetric resistance deviates from the above range, a vivid image cannot be obtained even in case of high dielectric constant. Namely in case of less than $10^4$ Ωcm, an electric charge generated on the surface of the member immediately scatters. Thus not only effective charging and image-transferring cannot be carried out but also an increase in load of a power source is resulted. In case of more than $10^{12}$ Ωcm, an electric charge generated on the surface of the member remains there in an amount more than required and a disturbance of an image due to discharging at peeling off occurs.

Suitable dielectric constant and volumetric resistance vary depending on an equipment and part to be used, or paper feeding speed and the like. Also the suitable volumetric resistance differs depending on the set dielectric constant.

The present invention further relates to a paint containing the above-mentioned carbon fluoride composition and a liquid carrier.

The liquid carrier is mixed since it is suitable for various painting works such as spray coating, brush coating and dip coating. Examples thereof are, for instance, lower ketones such as acetone, methyl ethyl ketone and cyclohexanone; lower esters such as ethyl acetate, propyl acetate, and butyl acetate; cyclic ethers such as tetrahydrofuran and 1,4-dioxane; water; a mixture of water with alcohols such as methanol, ethanol and isopropyl alcohol, glycols such as ethylene glycol and water soluble organic liquid such as methyl cellosolve; and not less than two kinds thereof. Particularly preferable liquid carrier is one comprising water as a main component from the viewpoint of painting workability, storage stability, protection of global environment and the like.

The content of the carbon fluoride composition in the paint of the present invention may be properly selected in consideration of painting workability, film forming property and the like, and is generally 10 to 70% by weight, preferably 30 to 60% by weight.

Further additives which are usually mixed in various paints, may be added depending on uses. As these additives, there are, for example, pigments, adhesion enhancing agents (organic resin powder and the like), lubricity imparting agents (fluorine-containing oil and the like), abrasion resistance enhancing agents (inorganic ceramic powder and the like), thickener, film forming agents, surfactants and the like. The mixing amounts of them may be suitably selected depending on uses, coating methods and the like. Attention is to be paid not to impair the intended semi-electric conductivity, non-tackifying property and high dielectric property of the present invention.

Then with respect to one example of the paint of the present invention, explanation is made on a fluorine-containing rubber paint in case where a fluorine-containing rubber is used as the component of the carbon fluoride composition.

The liquid carrier to be used is selected from the above-mentioned organic solvents such as lower ketone, lower ester and cyclic ether, water and a mixture of water and water soluble organic liquid. As the water soluble organic liquid, there are alcohols. Among these liquid carriers, water and one comprising water as a main component are most preferable from a point that no painting workability is impaired.

Inorganic fibrous substances as the other substances being contained in the fluorine-containing rubber paints are used to enhance compression restoration property of a fluorine-containing rubber coating. As the typical substances, there are glass fibers, carbon fibers, asbestos fibers, potassium titanate fibers, and the like. It is desirable that an average length of this inorganic fibrous substance is at least 1 μm, preferably 1 to 100 μm.

Amine compounds to be added, if desired, in the fluorine-containing rubber paint are intended to function mainly as the vulcanizing agent of the fluorine-containing rubber and improve mechanical property together with the above-mentioned coupling agent. Typical examples of such compounds are mono-amines such as ethyl amine, propyl amine, butyl amine, benzyl amine, allylamine, n-amyl amine and ethanolamine, diamines such as ethylenediamine, trimethylenediamine, tetramethylenediamine, hexamethylenediamine and 3,9-bis(3-aminopropyl)-2,4,8,10-tetraoxaspiro[5,5]undecane and polyamines such as diethylenetriamine, triethylenetetramine, tetraethylenepentamine and pentaethylenehexamine. Particularly amine compounds having two or more of terminal amino groups are preferable.

The fluorine-containing rubber paints are made homogeneous by usually mixing an electrically conductive substance, pigment, acid acceptor, filler and the like (in addition, surfactant may be used if necessary) with a mixture of a fluorine-containing rubber, fluorine-containing resin and liquid carrier, adding a coupling agent and, if necessary, amine compound (if necessary, the above-mentioned additives such as pigment, acid acceptor and filler may be added) to the obtained dispersion solution, and then mixing sufficiently by usual method.

The weight ratio of the fluorine-containing rubber to the fluorine-containing resin is desirably from 95/5 to 35/65. When the ratio of the fluorine-containing resin is lower than the above-mentioned lower limit, the intended improvement of non-tackifying property and lubricity is not sufficient. On the contrary, when higher than the mentioned upper limit, the intended coating thickness cannot be obtained and cracks and pin holes are easy to occur on the coating.

The adding amount of the mixture of the above-mentioned two kinds of carbon fluoride particles can be changed depending on uses of paints and kinds of electrically conductive substances. The mixture of carbon fluorides may be added so that the volume specific resistance of the fluorine-containing rubber coating is not more than $10^8$ Ωcm for the purpose to prevent charging, and not more than $10^2$ Ωcm in case of using as a plate heater.

The coupling agent is usually added in an amount of 1 to 50 parts by weight, preferably 1 to 20 parts by weight based on 100 parts by weight of a fluorine-containing rubber. In case where an amine compound is desired to be added, the amine compound and coupling agent are mixed so that a total amount of them becomes the value mentioned above. In this case, the mole ratio of the coupling agent to the amine compound is selected from the range of 1/99 to 99/1.

As the above-mentioned acid acceptor, there is used one usually used for the vulcanization of fluorine-containing rubbers in the same manner. For example, one or two or more kinds of bivalent metal oxides or hydroxides are used. Concretely there are oxides or hydroxides of magnesium, calcium, zinc, lead and the like. Also as the above-mentioned filler, there are used silica, clay, diatom earth, talc, carbon and the like.

The fluorine-containing paints are coated or impregnated onto the substrate by usual coating methods (brush coating, dipping, spraying and the like), and the intended fluorine-containing rubber coating can be obtained by curing under a temperature condition of from room temperature to 400° C., preferably from 100° to 400° C. for a suitable period of time.

Coating thickness of the fluorine-containing rubber paints is preferably not less than 5 μm. If the coating thickness is less than 5 μm, there is a fear that unevenness occurs on the whole surface of the substrate and there occurs uncoated part. The thus obtained fluorine-containing rubber coating has semi-electric conductivity, non-tackifying property and high dielectric property in addition to properties inherent to fluorine-containing rubbers such as heat resistance, weatherability, abrasion resistance, oil resistance, solvent resistance and chemical resistance, and is excellent in adhesivity to the substrate and mechanical property of the coating itself and is further endowed with lubricity on the coating surface.

The coupling agent is a compound acting on an interface between the organic material and the inorganic material and forming a more rigid bridge between both the materials rather than chemical or physical bonding. The coupling agent is usually a compound of silicon, titanium, zirconium, hafnium, trium, tin, aluminum or magnesium, and a compound having a group being capable of bonding the organic and inorganic materials. Among these coupling agents, preferable is silane coupling agent, and ortho-acid esters of transition elements of the group IV of the periodic table (for example, titanium, zirconium and the like) and their derivatives. Particularly an aminosilane compound is most preferable.

As the silane coupling agents, there can be, for example, silane compounds shown by the formula:

$R^1.Si.R^2_{3-a}.R^3_a$ (wherein, $R^1$ is an alkyl group or a vinyl group having 1 to 10 carbon atoms and at least one kind functional atom or group selected from chlorine atom, amino, aminoalkyl, ureide, glycidoxy, epoxy cyclohexyl, acryloyloxy, methacryloyloxy, mercapto and vinyl, $R^2$ and $R^3$ are respectively an atom or group selected from chlorine atom, hydroxyl, alkoxyl having 1 to 10 carbon atoms, alkoxy-substituted alkoxyl having 2 to 15 carbon atoms, hydroxyalkyloxyl having 2 to 4 carbon atoms and acyloxyl having 2 to 15 carbon atoms, a is 0, 1 or 2).

$R^1$ is an alkyl group having a functional substituent, and suitable examples thereof are β-aminoethyl, γ-aminopropyl, N-(β-aminoethyl)-γ-aminopropyl, γ-ureidopropyl, γ-glycidooxypropyl, β-(3,4-epoxycyclohexyl)ethyl, γ-acryloyloxypropyl, γ-methacryloyloxypropyl, γ-mercaptopropyl, β-chloroethyl, γ-chloropropyl, γ-vinylpropyl and the like. Also $R^1$ may be a vinyl group.

Examples of the above-mentioned silane compounds to be suitably used are, for instance, γ-aminopropyltriethoxysilane, N-β-aminoethyl-γ-aminopropyltrimethoxysilane, γ-ureidopropyltriethoxysilane, γ-glycidoxypropyltrimethoxysilane, γ-(3,4-epoxycyclohexyl)ethyltrimethylsilane, γ-methacryloxypropyltrimethoxysilane, γ-mercaptopropyltrimethdxysilane, γ-chloropropyltrimethoxysilane, vinyltris(β-methoxyethoxy)silane, vinyltriethoxysilane, vinyltrichlorosilane, vinyltriacetoxysilane, N-(trimethoxysilylpropyl) ethylenediamine, N-β-aminoethyl-γ-aminopropylmethyldimethoxysilane and β-aminoethyl-β-aminoethyl-γ-aminopropyltrimethoxysilane. Among these silane coupling agents, aminosilane compounds, for example, γ-aminopropyltriethoxysilane, N-β-aminoethyl-γ-aminopropyltrimethoxysilane, N-(trimethoxysilylpropyl) ethylenediamine, N-β-aminoethyl-γ-aminopropylmethyldimethoxysilane, γ-ureidopropyltriethoxysilane, β-aminoethyl-β-aminoethyl-γ-aminopropyltrimethoxysilane and the like are particularly preferable, because they function as the vulcanizing agents for the fluorine-containing rubbers, contribute to enhance adhesivity to the substrate, and further are used safely against the liquid carrier.

As the compounds of titanium, zirconium, hafnium and trium, there can be mentioned, for example, ortho acid esters shown by the formula:

$T(OR)_4$ (wherein, T is titanium, zirconium, hafnium or trium, R shows alkyl, cycloalkyl or allyl) and derivatives to be obtained by reacting them with one or more compounds having at least one functional group. As the above-mentioned compounds having at least one functional group, there can be used polyhydric alcohols such as glycerine, ethylene glycol, 1,3-butanediol, 2,3-butanediol, hexylene glycol and octylene glycol, oxyaldehydes such as salicylaldehyde and glycose, oxyketones such as diacetone alcohol and fructose, oxycarbonic acids such as glycolic acid, lactic acid, dioxy maleic acid and citric acid, diketones such as diacetylacetone, ketones such as acetoacetate, esters of ketonic acids such as acetoacetic ethyl, oxyamines such as triethanolamine and diethanolamine, and oxyphenol compounds such as cathecol and pyrogallol.

Concrete examples of the compounds in case where T is titanium, are tetraalkyltitanate (for example, tetraethyl titanate, tetraisopropyl titanate and tetrabutyl titanate), tetraethyleneglycol titanate, triethanolamine titanate, titanium acetylacetonate, isopropyltrioctanoyl titanate, isopropyl trimethacryl titanate, isopropyltriacryl titanate, isopropyltri (butyl, methylpyrophosphate) titanate, tetraisopropyldi (dilaurylphosphite) titanate, dimethacryloxy acetate titanate, diacryloxy acetate titanate, di(dioctylphosphate) ethylene titanate and the like.

As the zirconium compounds, there can be used the same compounds as the above-mentioned titanium compounds. Examples thereof are tetraalkyl zirconates such as tetraethyl zirconate and tetrabutyl zirconate, n-propyl zirconate, isopropyl zirconate, n-butyl zirconate, isobutyl zirconate, zirconium acetylacetonate and the like.

As the compounds of hafnium and trium, there can be used the same compounds as the titanium and zirconium compounds.

As the tin compounds, there can be used organic or inorganic compounds, for example, $SnCl_4$ and the like. As the aluminum compounds, there can be mentioned aluminum isopropylate, monosec-butoxyaluminum diisopropylate, aluminumsec-butylate, ethylacetoacetate aluminum diisopropylate, aluminumtris (ethylacetoacetate) and the like.

As the magnesium compounds, there can be mentioned magnesium alcoholates such as magnesium methylate and magnesium ethylate.

The semi-electric conductivity of the above-mentioned fluorine-containing rubber paint has a feature that the resistivity can be easily controlled to be a desired value by selecting the kinds of the two kinds of carbon fluoride particles to be mixed, fluorine content and mixing amount.

Also this fluorine-containing rubber paint has a feature that by its excellent dispersibility as the paint and a little increase in paint viscosity, coating is easy and as a result, a coating having uniform property can be obtained easily.

The fluorine-containing rubber paint is as referred to hereinabove, and the paint of the present invention can also be produced in the same manner when other resins or rubbers than the fluorine-containing rubbers are used.

Mentioned below are descriptions relating to only characteristic matters of each resin and rubber. Other technical matters and conditions are substantially the same as those of the fluorine-containing rubber paint, and it is possible to make a design change obvious to a person skilled in the art.

As one example of the paint of the present invention, explained below is the case where a fluorine-containing resin is used as the component of the carbon fluoride composition.

Examples of the fluorine-containing resins are polytetrafluoroethylene; copolymers of tetrafluoroetylene with at least one of other copolymerizable ethylenically unsaturated monomer (for example, olefins such as ethylene and propylene, halogenated olefins such as hexafluoropropylene, vinylidene fluoride, chlorotrifluoroethylene and vinyl fluoride, and perfluoroalkyl vinyl ethers); polychlorotrifluoroethylene; polyvinylidene flouride; and the like. Particularly preferable flourine-containing resins are polytetrafluoroethylene, copolymers of tetrafluoroethylene with at least one of hexafluoropropylene, perfluoro(methyl vinyl ether), perfluoro(ethyl vinyl ether) and perfluoro (propyl vinyl ether) (containing generally in an amount of not more than 40% by mole with respect to tetrafluoroethylene), and the like.

The liquid carrier is mixed since it is suitable for various painting works such as spray coating, brush coating and dip coating. Examples thereof are, for instance, lower ketones such as acetone, methyl ethyl ketone and cyclohexanone; lower esters such as ethyl acetate, propyl acetate, and butyl acetate; cyclic ethers such as tetrahydrofuran and 1,4-dioxane; water; a mixture of water with alcohols such as methanol, ethanol and isopropyl alcohol, glycols such as ethylene glycol and water soluble organic liquid such as methyl cellosolve; and not less than two kinds thereof. Particularly preferable liquid carrier is one comprising water as a main component from the viewpoint of painting workability, storage stability, protection of global environment and the like.

In addition, surfactants, pigments, fillers and various painting additives can be added if necessary.

Further additives which are usually mixed in various paints, may be added depending on uses. As these additives, there are, for example, pigments, adhesion enhancing agents (organic resin powder and the like), lubricity imparting agents (fluorine-containing oil and the like), abrasion resistance enhancing agents (inorganic ceramic powder and the like), thickener, film forming agents, surfactants and the like. The mixing amounts of them may be suitably selected depending on uses, coating methods and the like. Attention is to be paid not to impair the intended semi-conductivity, non-tackifying property and dielectric property of the present invention.

The adding amount of the mixture of the two kinds of carbon fluoride particles can be changed depending on uses of paints, a kind of the carbon fluoride particles and the degree of the fluorination. The carbon fluoride may be added so that the volume specific resistance is not more than $10^8$ $\mu$m for the purpose to prevent electric charging.

In case where polyamides are used as the component of the carbon fluoride composition for the paint of the present invention, paints can be prepared in the same manner as in the above-mentioned fluorine-containing resin. Also it is possible to previously combine the mixture of the two kinds of carbon fluoride particles with polyamide fine particles by a dry method to give composite fine particle materials and then disperse them in the liquid carrier by a proper method. As the polyamide fine particles to be used in this case, there can be mentioned fine particles of a spherical form, for example, SP-500 (available from Toray Kabushiki Kaisha). For the combining method, for example, Hybridizer (available from Kabushiki Kaisha Nara Kikai Seisakusho), Mechanomill (available from Okada Seiko Kabushiki Kaisha) and the like can be used. The feature of this method is such that since composite fine particle materials are previously prepared, they are mixed homogeneously, and a uniform coating is easily obtained irrespective of paints being in a dispersed state.

Also in case where polyamideimides are used as the component of the carbon fluoride composition for the paint of the present invention, in the same manner as in case of the above-mentioned fluorine-containing resins and polyamides, the polyamideimides not only are used alone, but also are mixed with fluorine-containing resins for use as a primer paint for a fluorine-containing resin paint or are mixed with thermoplastic resins such as polyamides to improve mechanical property.

In case where silicone resins or silicone rubbers are used as the component of the carbon fluoride composition for the paint of the present invention, an organic solvent mainly such as toluene or silicone oil having a low boiling point is used as the liquid carrier. The carbon fluoride compositions added together with a catalyst (for example, zinc octylate) and various additives to a commercially available composition for curing (for example, SR-2400, available from Toray Dow Corning International Kabushiki Kaisha), and fully dispersed in triple rolls and the like. The solvent such as toluene is added to give a paint having a viscosity conforming to a coating method. After the painting, the paint is cured at a specified temperature (for example, 235° C., for 1 hour).

With regard to rubbers for general uses, the mixing can be carried out in compliance with properties of each rubber in the same manner as in the above-mentioned fluorine-containing rubber and silicone rubber.

Further the present invention relates to an image forming member for electrophotographic copying machines, facsimile machines and printers which is obtained by applying the above-mentioned paint on an electrically conductive supporting body to form a surface layer thereon.

Examples of the image forming member for the electrophotographic copying machines, are for instance, a charging roller, image-transferring roller, fixing roller, resist roller, developing roller, paper feed roller, electrically conductive belt, dielectric belt, image-transferring belt, photosensitive belt, fixing belt, toner feed belt, paper feed belt, paper supplying belt, image-transfer sheet, paper adsorption sheet, sheet-like member, charged magnetic brush, charged fiber brush, magnetic particles for a charging member and the like.

Examples of the image forming member for the facsimile machines, are for instance, a charging roller, image-transferring roller, fixing roller, resist roller, developing roller, paper feed roller, electrically conductive belt, dielectric belt, image-transferring belt, photosensitive belt, fixing belt, toner feed belt, paper feed belt, paper supplying belt, image-transfer sheet, paper adsorption sheet, sheet-like member, charged magnetic brush, charged fiber brush, magnetic particles for a charging member and the like.

Examples of the image forming member for the printers, are for instance, a charging roller, image-transferring roller, fixing roller, resist roller, developing roller, paper feed roller, electrically conductive belt, dielectric belt, image-transferring belt, photosensitive belt, fixing belt, toner feed belt, paper feed belt, paper supplying belt, image-transfer sheet, paper adsorption sheet, sheet-like member, charged magnetic brush, charged fiber brush, magnetic particles for a charging member and the like.

An electrophotographic copying machine using a contact charge method has a structure as stated, for instance, in JP-A-4-311972. The structure thereof is, for example, one as shown in FIG. 1. A photosensitive drum 1 usually comprises an organic photoreceptor, and there may be used selenium, CdS, amorphous silicon and the like. A charging roller 2 is disposed being brought into contact with the above-mentioned photosensitive drum 1. A developing device 3, an image-transferring roller 5 and a toner cleaner 7 are arranged in the clockwise direction, centering around the charging roller 2. Further a fixing roller 6 for fixing of an image-transferred paper 4 fed out from the transferring roller 5 is disposed in the vicinity of the photosensitive drum 1 between the transferring roller 5 and the toner cleaner 7.

The image forming process of the electrophotographic method using the semi-conductive roller is briefly explained hereinbelow.

The charging roller 2 comprising the semi-conductive roller having an elasticity is rotated on the outer circumferential surface of the photoconductive drum 1 (for instance, linear speed 60 mm/sec) rotating in the direction of an arrow, by the photosensitive drum 1, being partly elastically deformed. The outer surface of the photosensitive drum 1 is electrically charged by bringing it into contact with this charging roller 2. On the surface of the thus charged photosensitive drum 1 is formed an electrostatic latent image corresponding to an original image by means of an exposing mechanism portion 8, and this latent image is made into a visible image by a developing device 3. Then an electric charge reverse to the visible image of toner particles which is formed on the photosensitive drum 1 is applied to a transfer paper 4 through the tansferring roller 5 to transfer the visible image of the toner particles onto the transfer paper 4. The visible image of the toner particles electrostatically sticking to the transfer paper 4 is fused and deposited on the transfer paper 4 by the heated fixing roller 6 to give a fixed image.

In this case, 85 to 95% of the toner sticking onto the surface of the above-mentioned photosensitive drum 1 by means of the transferring roller 5 is transferred on the drum but the remaining toner after this transfer is nearly completely removed by means of a toner cleaner 7, then is wholly subjected to an emission of light by an eraser 9, and initiated to make preparation for the subsequent charging.

Figure 2:
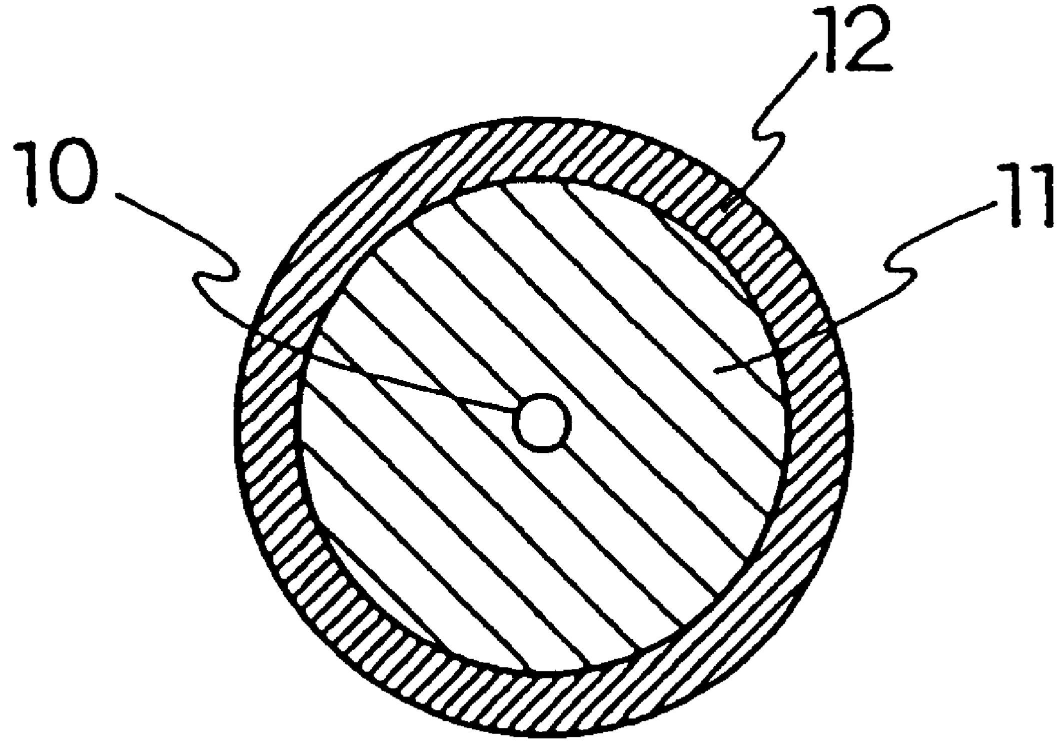
FIG. 2 is an outline cross-sectional view showing a layer configuration of the semi-conductive roller of the present invention.

As mentioned above, for the electrophotographic copying machine and the like, there are used many semiconductive rollers such as the charging roller, developing roller, transferring roller and fixing roller. As shown in FIG. 2, such a semi-conductive roller to be used is such that a metallic core roll 10 and an electrically conductive elastic layer 11 on the outer circumference thereof are formed and an electrically resistive layer 12 is formed over this electrically conductive elastic layer 11.

In the above-mentioned roller, the electrically conductive elastic layer is first formed on the electrically conductive supporting body. Materials of this electrically conductive elastic layer is not particularly limited, and this layer comprises a composition prepared by mixing electrically conductive powder and fiber (carbon black, metal powder, carbon fiber and the like) in a synthetic rubber such as silicone rubber, ethylene propylene rubber, epichlorohydrine rubber, nitrile rubber and urethane rubber. This layer has a volume specific resistance of not more than $10^5$ Ωcm, preferably not more than $10^3$ Ωcm and a rubber hardness (JIS A) in the range of 20 to 50 degrees, preferably 25 to 40 degrees. It is not preferable to use a plasticizer and surfactant for the purposes of adjusting a resistance and a rubber hardness when mixing the electrically conductive powder and the like. This is because these chemicals bleed out with the lapse of time, resulting in the contamination of the surface of the photoreceptor and the occurrence of toner filming on the surface of the roller.

The materials of the electrically conductive supporting body are not particularly limited, and aluminum or an alloy comprising aluminum as a main component or stainless steel can be used.

Then the method for producing the above-mentioned roller is explained below. (i) At first, as the material for the electrically conductive elastic layer, for instance, a peroxide vulcanizing agent is added to a rubber compound prepared by dispersing a carbon black in a heat-vulcanizing silicone rubber, and then kneaded sufficiently with twin rollers to obtain a carbon black-dispersed rubber compound having a homogeneous composition. (ii) This rubber compound is wound on an outer circumference of a metal core roll, and put in a die for molding the roller which has been preheated (for instance, 170° C.). Then a specified pressure (for instance, 120 kg/cm$^2$) is applied to carry out a first vulcanization (for instance, for 10 minutes). (iii) Then the pressure applied to the die is relieved, and the roller is taken out to carry out a second vulcanization (for instance, 200° C., for 4 hours). (iv) After that, the surface of the roller is polished, and the required outside dimensions are obtained and at the same time, the surface roughness is made to be not more than 10 μm (Rz). (v) Afterwards the electrically conductive non-tackifying composition as the material for the electrically resistive layer is coated on the outer circumference of the electrically conductive elastic layer obtained in (iv) with air spray (or dipping method) (coating thickness 30 to 200 μm), and sintering is conducted under the specified conditions (for instance, 300° C., for 20 minutes). As the sintering method, in order to minimize heat deterioration of the electrically conductive elastic layer, it is desirable to properly use an infrared image oven.

In case where the above-mentioned roller is used as, or example, the semi-conductive roller of the electrophotographic copying machine of the present invention, it is preferable to use the above-mentioned paint containing the carbon fluoride composition as a material for the electrically resistive layer of above (v) and use a fluorine-containing polymer such as a fluorine-containing resin or fluorine-containing rubber as the resin or rubber in the composition because excellent non-tackifying property and heat resistance against the toners, durability and the like can be obtained and the roller has excellent semi-conductivity, particularly high dielectric property.

Also, in case where the electrically resistive layer is formed by adding and dispersing the mixture of two kinds of carbon fluoride particles in the fluorine-containing polymer, electric conductivity can be controlled by the carbon fluoride, and also an electric breakdown is hard to occur because of an enhanced dispersibility and the deterioration of non-tackifying property against the toners is solved. Further it is a surprise that abrasion resistance is enhanced as compared with a fluorine-containing polymer alone, and sufficient property as the semi-conductive roller can be exhibited.

Further when the thermoplastic resins such as polyamide and polyamideimide, thermosetting resins such as a silicone resin, silicone rubbers and rubbers for general uses are used besides the fluorine-containing polymers, they are useful as the electrically resistive layer of the semi-conductive roller because non-tackifying property and lubricity of the carbon fluoride function additionally. However among these resins, there are ones having heat resistance and stability of chemical and electrical properties being inferior as compared with the fluorine-containing polymer, and therefore for the semi-conductive rollers produced using these resins, considerations are required for the operating conditions and the position where the rollers are used.

Further the present invention relates to the composite material comprising fine particles of carbon fluoride, in which the composite material is covered with completely fluorinated carbon fluoride fine particles having a F/C of not less than 1 and the inside of the composite material comprises a carbon fluoride fine particle or particles having a F/C of not more than 0.1.

Further in the present invention, it is preferable that in preparing the composite material, the completely fluorinated carbon fluoride fine particles having a F/C of not less than 1 are mixed simply with the carbon fluoride fine particles having a F/C of not more than 0.1.

Further in the present invention, it is preferable that in preparing the composite material, the completely fluorinated carbon fluoride fine particles having a F/C of not less than 1 are mixed with the carbon fluoride fine particles having a F/C of not more than 0.1, in water, in organic solvent, in rubber or in molten resin.

Further the present invention relates to the composite material comprising fine particles of carbon fluoride in which the composite material is covered with completely fluorinated carbon fluoride fine particles having a F/C of not less than 1, and the inside of the composite material comprises an electrically conductive fine particle or particles having a particle size of at least 5 times the particle size of the completely fluorinated carbon fluoride fine particles.

Further in the present invention, it is preferable that in preparing the composite material, the completely fluorinated carbon fluoride fine particles having a F/C of not less than 1 are simply mixed with the electrically conductive fine particles having a particle size of at least 5 times the particle size of the completely fluorinated carbon fluoride fine particles.

Further in the present invention, it is preferable that in preparing the composite material, the completely fluorinated carbon fluoride fine particles having a F/C of not less than 1 are mixed with the electrically conductive fine particles having a particle size of at least 5 times the particle size of the completely fluorinated carbon fluoride fine particles, in water, in organic solvent, in rubber or in molten resin.

Examples of the preferred carbon fluoride composition of the present invention are, for instance, those mentioned below.

(A) At least one selected from the group consisting of resins and rubbers (B) Carbon fluoride particles This composition is advantageous in that it has excellent semi-conductivity and non-tackifying property and a specific dielectric constant is not less than 10 at 25° C. at 1 kHz.

More preferably, (A1) Fluorine-containing resin and/or fluorine-containing rubber (B1) Mixture of completely fluorinated carbon fluoride particles and carbon fluoride particles having the F/C of not more than 0.1

This composition is excellent in heat resistance, chemical stability, non-tackifying property, semi-conductivity and high dielectric property.

The present invention is then explained by means of examples, but is not limited to them.

EXAMPLES 1 TO 8

Dielectric Property of Coating Film

A hundred grams of Ketchen Black EC (available from Ketchen Black International) was spread uniformly in a box type reactor made of monel and then heated up to 400° C. with flowing nitrogen gas. Then, fluorine gas and nitrogen gas were flowed at 200 ml/min and 1800 ml/min, respectively for one hour to carry out a fluorination reaction. Immediately after the reaction, the inside of the reactor was replaced with nitrogen gas and was cooled down to room temperature with flowing nitrogen gas. Then a reaction product was taken out. The reaction product was slightly fluorinated carbon fluoride particles having the F/C of 0.08.

Also completely fluorinated carbon fluoride particles having the F/C of 1.15 were prepared under the same conditions except that the reaction time was 23 hours.

The completely fluorinated carbon fluoride particles and slightly fluorinated carbon fluoride particles were mixed in calculated amounts and tumbled in a polyethylene bag sufficiently to give a carbon fluoride mixture having the average F/C of 0.5 (Examples 1 to 4). Also by changing a mixing ratio, the carbon fluoride particles having the F/C of 0.1 (Example 5), 0.3 (Example 6), 0.7 (Example 7) and 0.9 (Example 8), respectively were obtained.

Then with 30 g of a green rubber of fluorine-containing rubber (Daiel G501NK available from Daikin Industries, Ltd.), the carbon fluoride mixture having the F/C of 0.5 in an amount of 1.8 g (6% based on the green rubber) (Examples 1 and 5 to 8), 3.6 g (12% based on the green rubber) (Example 2), 5.4 g (18% based on the green rubber) (Example 3) or 7.2 g (24% based on the green rubber) (Example 4), and 1.5 g of hydrotalcite (DHT-4A available from Kyowa Chemical Industry Co., Ltd.) were mixed, and then a butyl acetate was added to give 300 g of a mixture. Then the mixture was pulverized for 48 hours in a magnetic ball mill (ø150) to give a paint.

This paint was applied to a surface of an aluminum plate by an applicator, and after drying at 65° C. for 30 to 40 minutes, was baked at 200° C. for 30 minutes to give coating of Examples 1 to 4. With respect to the coatings, the following measurements were made.

(Method of measuring electric conductivity)

Analyzer: R8340A (available from Advantest) and 196 System DMM (available from Keithley Corp.)

Electrode: R12702A (available from Advantest Kabushiki Kaisha)

Pressure of electrode: 3 to 4 kgf

Applied voltage: 10V

Charging time: 1 minute

Measurement was made according to JIS K6911.

(Method of measuring dielectric constant)

Analyzer: HP4194A, HP4274A (available from Hewlett Packard Japan, Co., Ltd.)

Electrode: HP16451B (available from Hewlett Packard Japan, Co., Ltd.)

Electrode size: ø5 mm (Electrode B)

Frequency: 1 kHz

Measurement was made according to JIS C2317.

The results are shown in Tables 1 to 3.

TABLE 1

| | Added amount of carbon fluoride mixture | Coating thickness (μm) | Electrostatic capacity 1 kHz | Electrostatic capacity 1 MHz | Electrostatic capacity 10 MHz | Dielectric loss 1 kHz | Dielectric loss 1 MHz | Dielectric loss 10 MHz | Specific dielectric constant 1 kHz | Specific dielectric constant 1 MHz | Specific dielectric constant 10 MHz |
|---|---|---|---|---|---|---|---|---|---|---|---|
| Ex. 1 | 6% | 15 | 29 | 21.76 | 19.7 | 0.04 | 0.114 | 0.11 | 2.5 | 1.87 | 1.7 |
| Ex. 2 | 12% | 18 | 63.36 | 29.8 | 21.5 | 0.212 | 0.185 | 0.18 | 6.56 | 3.08 | 2.23 |
| Ex. 3 | 18% | 18 | 2160 | 756.98 | 300 | 20 | 0.375 | 0.375 | 223.7 | 78.39 | 31.07 |
| Ex. 4 | 24% | 24 | 12000 | 1799 | 530 | 13 | 0.791 | 1.6 | 1657 | 248.4 | 54.89 |

TABLE 2

| | | Ex. 1 | Ex. 2 | Ex. 3 | Ex. 4 |
|---|---|---|---|---|---|
| F/C of carbon fluoride mixture | | 0.5 | 0.5 | 0.5 | 0.5 |
| Added amount of carbon fluoride mixture | | 6% | 12% | 18% | 24% |
| Volumetric resistance (Ω · cm) | 2 V | $3.3 \times 10^8$ | $5.4 \times 10^6$ | $4.4 \times 10^6$ | $3.5 \times 10^6$ |
| Specific dielectric constant | 1 kHz | 2.5 | 6.6 | 224 | 1657 |
| Dielectric loss | 1 kHz | 0.04 | 0.212 | 20 | 13 |
| Contact angle (degree) | Water | 99.2 | 106.1 | 110.5 | 116.7 |
| | Hexadecane | 49.7 | 47.6 | 48.5 | 50.2 |
| Friction coefficient (Steel ball φ3 mm, 1 Kg load, 0.2 cm/sec) | | 0.20 | 0.29 | 0.27 | 0.29 |
| | 12 rpm | 160 | 207 | 630 | 977 |
| Viscosity of paint (mPa · s) (Brookfield viscometer Rotor No. 2) | 60 rpm | 133 | 156 | 313 | 427 |

TABLE 3

| | | Ex. 5 | Ex. 6 | Ex. 1 | Ex. 7 | Ex. 8 |
|---|---|---|---|---|---|---|
| F/C of carbon fluoride mixture | | 0.1 | 0.3 | 0.5 | 0.7 | 0.9 |
| Mixing ratio of carbon fluoride particles[1)] | | 5:95 | 39:61 | 62:38 | 78:22 | 89:11 |
| Added amount of carbon fluoride mixture | | 6% | 6% | 6% | 6% | 6% |
| Volumetric resistance (Ω· cm) | 2 V | $5.3 \times 10^6$ | $4.0 \times 10^7$ | $3.3 \times 10^8$ | $3.2 \times 10^{13}$ | $5.9 \times 10^{14}$ |
| Specific dielectric constant | 1 kHz | 29.4 | 17.6 | 2.5 | 2.2 | 2.4 |
| Dielectric loss | 1 kHz | 5.8 | 3.3 | 0.04 | 0.12 | 0.01 |
| Contact angle (degree) | Water | 108.2 | 100.7 | 99.2 | 96.8 | 97.2 |
| | Hexadecane | 50.0 | 49.2 | 49.7 | 47.5 | 51.1 |
| Friction coefficient (Steel ball φ3 mm, 1 Kg load, 0.2 cm/sec) | | 0.31 | 0.29 | 0.20 | 0.21 | 0.21 |
| | 6 rpm | 675 | 316 | 160 | 128 | 122 |
| Viscosity of paint (mPa · s) (Brookfield viscometer Rotor No. 1) | 12 rpm | 480 | 255 | 151 | 130 | 122 |

[1)]Mixing ratio of the completely fluorinated carbon fluoride particles (F/C = 1.15) to the slightly fluorinated carbon fluoride particles (F/C = 0.08)

EXAMPLES 9 TO 11

Dielectric Property of Sheet

A sheet of 1 mm thick was obtained from the following omposition under the following kneading conditions and rosslinking conditions.

(Composition)

| | |
|---|---|
| Daiel G-501NK (available from Daikin Industries, Ltd.) | 100 parts |
| KYOWAMAG MA-30 (available from Kyowa Chemical Industries, Ltd.) | 15 parts |
| Crosslinking agent V-3 (available from Daikin Industries, Ltd.) | 3 parts |

-continued

| Carbon fluoride (F/C = 0.3) | |
|---|---|
| (Example 9) | 6 parts |
| (Example 10) | 10 parts |
| (Example 11) | 15 parts |

The carbon fluoride mixture used was prepared in the same manner as in Examples 1 to 8.

(Kneading conditions)

Twin rolls, Roll distance: 0.5 mm,

Kneading time: 30 minutes (Crosslinking conditions)

First vulcanizing: 170° C.×20 minutes at 35 $kg/cm^2$

Secondary vulcanizing: 200° C.×24 hours in a hot air circulation type electric oven With respect to this sheet, the same measurements as in Example 1 were made.

The results are shown in Table 4.

TABLE 4

| | Added amount of carbon fluoride mixture | Coating thickness (μm) | Electrostatic capacity | | | Dielectric loss | | | Specific dielectric mixture | | |
|---|---|---|---|---|---|---|---|---|---|---|---|
| | | | 1 kHz | 1 MHz | 10 MHz | 1 kHz | 1 MHz | 10 MHz | 1 kHz | 1 MHz | 10 MHz |
| Ex. 9 | 6% | 1.15 | 2.98 | 1.59 | 0.962 | 0.041 | 0.26 | 0.33 | 19.72 | 10.52 | 6.365 |
| Ex. 10 | 10% | 1.25 | 5.64 | 2.56 | 1.6 | 0.091 | 0.294 | 0.299 | 40.56 | 18.41 | 11.51 |
| Ex. 11 | 15% | 1.35 | 215.96 | 12.59 | — | 0.453 | — | — | 1677 | 97.79 | — |

As it is clear from the results of Tables 1 to 4, a desired semi-conductivity and high dielectric property can be obtained by adjusting a degree of fluorination and adding amount of carbon fluoride particles. Also it is clear that in any cases, a high non-tackifying property is obtained.

INDUSTRIAL APPLICABILITY

The image forming member provided thereon with the surface layer obtained by applying the paint of the present invention containing the carbon fluoride composition has semiconductivity, non-tackifying property, and particularly high dielectric property, namely a specific dielectric constant of not less than 10 at 25° C. at 1 kHz. The image forming member is high in charging efficiency and image-transferring efficiency, is excellent in feeding property and separating property of papers and is free from jamming of papers, thus giving a good image stably.

What is claimed is:

1. A carbon fluoride composition comprising carbon fluoride particles and at least one selected from the group consisting of resins and rubbers, said composition possesses semi-conductivity and non-tackifying property and has a specific dielectric constant of not less than 10 at 25° C. at 1 kHz, wherein said carbon fluoride particles are obtained by fluorinating a carbon black at 200° to 600° C. and are a mixture of completely fluorinated carbon fluoride particles and slightly fluorinated carbon fluoride particles having a molar ratio F/C of fluorine atom to carbon atom of not more than 0.1.

2. The carbon fluoride composition of claim 1, wherein said resin is a fluorine-containing resin and said rubber is a fluorine-containing rubber.

3. The carbon fluoride composition of claim 1, wherein a volumetric resistance of the composition can be regulated within the range of from $10^4$ to $10^{12}$ Ωcm and can give an image forming member having a difference in volumetric resistance between any points on surface of the member within one order.

4. The carbon fluoride composition of claim 1, wherein an angle of contact to water is not less than 90 degrees.

5. A paint comprising the carbon fluoride composition of claim 1 and a liquid carrier.

6. An image forming member for electrophotographic copying machines which comprises an electrically conductive supporting body having a surface layer formed by applying a paint comprising the carbon fluoride composition of claim 1 and a liquid carrier.

7. An image forming member for electrophotographic facsimile machines which comprises an electrically conductive supporting body having a surface layer formed by applying a paint comprising the carbon fluoride composition of claim 1 and a liquid carrier.

8. An image forming member for electrophotographic printers which comprises an electrically conductive supporting body having a surface layer formed by applying a paint comprising the carbon fluoride composition of claim 1 and a liquid carrier.

* * * * *